United States Patent
Komiyama et al.

[11] Patent Number: 5,956,317
[45] Date of Patent: Sep. 21, 1999

[54] COMPOSITE OPTICAL DISK WITH STRUCTURE FOR PREVENTING ADHESIVE FROM LEAKING INTO THE CENTER HOLE

[75] Inventors: Takeshi Komiyama; Makoto Hamamura, both of Shizuoka, Japan

[73] Assignee: Toshiba-Emi Limited, Tokyo, Japan

[21] Appl. No.: 08/686,836

[22] Filed: Jul. 26, 1996

[30] Foreign Application Priority Data

Jul. 28, 1995 [JP] Japan ................................. 7-193272
Aug. 24, 1995 [JP] Japan ................................. 7-216084

[51] Int. Cl.$^6$ ....................................................... G11B 7/26
[52] U.S. Cl. ............................................................ 369/286
[58] Field of Search ................................... 369/284, 282, 369/286, 272, 275.1–275.5; 360/133, 135; 156/275.5, 275.7, 276, 295, 307.3; 346/135.1, 137

[56] References Cited

U.S. PATENT DOCUMENTS

| | | | |
|---|---|---|---|
| 4,623,570 | 11/1986 | Alexander et al. | 369/288 |
| 4,892,606 | 1/1990 | Miyazaki et al. | 369/286 |
| 5,132,960 | 7/1992 | Hosokawa et al. | 369/286 |
| 5,681,634 | 10/1997 | Miyamoto et al. | 369/272 |
| 5,728,250 | 3/1998 | Kakinuma | 369/275.5 |

*Primary Examiner*—Brian E. Miller
*Attorney, Agent, or Firm*—McDermott, Will & Emery

[57] ABSTRACT

A composite optical disk structure includes a first transparent disk plate having a first center hole, a first stamper clamp groove and a first information recording area on its one main surface; a second transparent disk plate having a second center hole having a diameter equal to that of the first center hole, a second stamper clamp groove and a second information recording area on its one main surface; a transparent adhesive sandwiched between the first and second transparent disk plates to bond the one main surfaces of them; and a mechanism formed between the one main surfaces for preventing the transparent adhesive from leaking our into the center holes.

5 Claims, 9 Drawing Sheets

COMPOSITE OPTICAL DISK WITH STRUCTURE FOR PREVENTING ADHESIVE FROM LEAKING INTO THE CENTER HOLE

BACKGROUND OF THE INVENTION

1. Field of the Invention

The present invention relates to a composite optical disk structure in which reproduction is carried out from the one side or both sides of a composite optical disk structure consisting of two single-side disk plates bonded to each other.

2. Description of the Prior Art

There has been proposed an optical disk structure composed of two sheets of bonded disk plates for reading recorded information by using laser light. Such an optical disk structure includes a laser disk structure and DVD (digital video disk). An explanation will be given of a process of fabricating a conventional laser disk structure.

First, with a metallic mold (referred to as "stamper"), on which pits bearing recorded information are formed previously, attached to a resin molding machine such as an injection molding machine, a transparent resin material of polycarbonate or acrylic is injection-molded or pressure-molded to form a transparent disk plate (single-side disk plate) which is a transparent disk with pits duplicated (plate molding step). The actual plastic disk (single-side disk plate) fabricated by the plate molding step contains a ring-shaped concave groove (hereinafter referred to as "stamper clamping groove") which abuts on the stamper clamp for clamping the stamper to the resin molding machine.

A metallic material such as aluminum is applied to the pit face of the disk plate by sputtering or vacuum evaporation to form a reflection film (reflection film making step). A protection film of hot-melt type is applied to the surface of the reflection film by a roll coating machine to form a protection film (5–30 $\mu$m) for preventing damage or corrosion (protection film applying step).

Thus, a pair of single-side disk plates having surfaces A and B to be bonded to each other are individually formed. Thereafter, thermoplastic adhesive called "hot-melt" having a thickness of 5–30 $\mu$m) is applied to the bonding surfaces A and B of the respective single-side disk plates A and B (adhesive applying step).

A pair of single-side disk plates with adhesive applied are bonded to each other in such a manner as shown in FIG. 8 (bonding step). Specifically, the adhesive-applied bonding surfaces of a pair of single-side disk plates 10a and 10b which are mated with each other are placed on a lower-side crimping table 51 having a flat pressing face. Thereafter, an upper crimping table 52 is lowered by a pressure cylinder 53 so that the pair of single-side disk plates 10a and 10b are pressure-crimped by the flat pressing face into one sheet of laser disk.

In such a laser disk structure, adhesive of hot-melt type is applied to the other portion than a center hole, and solidified by cooling. Thereafter, the disk surfaces are bonded to each other by means of the solidified adhesive. Therefore, there is weak possibility that the adhesive sticks or leaks out toward the center hole.

In recent years, a digital video disk structure called "DVD" of a double-side recording system having a small size (diameter: 12 cm and thickness of the one side of the optical disk: 0.6 mm) permitting high density recording has been developed. The DVD can be fabricated by the same manner as in the process as described above except that ultraviolet rays setting resin is applied onto the surface of the protection film by using a spinner.

It is well known that the recording capacity of the DVD can be increased by a "double layer recording". The double layer recording will be carried out as follows. As shown in FIG. 6A, a total internal reflection film 114 made of e.g. aluminum is formed on the one recording surface of a single-side disk plate 101 and a semi-transparent film 124 of e.g. dielectric is formed on the one recording surface of another single-side optical disk plate 102. These recording surfaces are bonded apart from each other by a prescribed interval through an ultraviolet rays setting resin 16. The ultraviolet rays setting resin 16 serves as a bonding layer and a protection layer.

Information reading from the recording single-side reproduction type composite disk structure thus formed is carried out as follows. As shown in FIG. 7, the laser light 133 emitted from a semiconductor laser 131 is converged on the semi-transparent film 124 serving as a first recording surface by a converging lens 132 to read the information by means of the light reflected therefrom. The information on the total internal reflection film serving as a second recording surface can be read in such a manner that the converging lens 132 is moved to a prescribed location 132 toward the composite optical disk structure, laser light 135 is converged on the second recording surface 114 as spot light to read the information by means of the light reflected therefrom.

FIG. 5A is a plan view of first and second single-side disk plates; and FIG. 5B is a sectional view thereof. As shown in FIGS. 5A and 5B, the first single-side optical disk plate 101 constituting a part of the double-layer recording type composite optical disk structure includes a disk clamp area C around a center hole 110, a stamper clamp groove 113 around the disk clamp area C, an data recording area 115 which is an information recording area around the stamper clamp groove 113, a total internal reflection film 115 covering the data recording area 114 and a signal-free area 117 around the data recording area 114.

Likewise, the second single-side optical disk plate 102 constituting a part of the recording type composite optical disk structure also includes a disk clamp area C around a center hole 120, a stamper clamp groove 123 around the disk clamp area C, an data recording area 125 which is an information recording area around the stamper clamp groove 123, a semi-transparent film 125 covering the data recording area 124 and a signal-free area 127 around the data recording area 124.

In the double-layer recording type composite optical disk structure, the opaque hot-melt which was used to bond the laser disk plates as described previously cannot be used to bond the first and second single-side optical disk plates 101 and 102 to each other. In place of it, an ultraviolet rays setting type adhesive which can transmit light can be used. This is because ultraviolet rays can be irradiated through the semitransparent film 124 constituting the first recording surface.

Thus, as shown in FIG. 6A, such an ultraviolet-rays setting type adhesive 16 is filled between the total internal reflection film 114 and the semitransparent film 124 by a spin-coating method to bond the pair of optical disk plates 101 and 102. In such a double-layer recording type composite optical disk structure, in order that either one of two data recording areas 115 and 125 can be selectively reproduced, i.e., two recording areas are not simultaneously located within the focusing depth of the convergence lens 132, the ultraviolet rays setting type resin layer 16 must have a thickness of 30–40 $\mu$m.

However, in the conventional double-layer recording type composite optical disk structure, it was difficult to bond the total internal reflection film 114 and the semi-transparent film 124 apart from each other by a prescribed interval (e.g. 40 μm).

Further, as shown in FIG. 6B, in bonding the one-side optical disk plates 101 and 102 to each other, the adhesive 16 therebetween may stick out into the center holes 110 and 120 so that the stick-out portion 16a is solidified, thus deforming the internal shapes of the center holes 110 and 120.

Now referring to FIGS. 9A to 9E, this problem will be explained in more detail.

The double-layer recording type composite disk structure has been fabricated as explained below. First, a first single-side disk 221 is prepared in which a center hole 221a, a clamping area 221c, a clamping area back face 221c', a stamper clamp groove 221d and pits for information recording are formed on a transparent plastic disk plate 221p. A total internal reflection film 221e is vacuum evaporated on the recording area where the pits for information recording are formed.

Likewise, a second single-side disk plate 222 is prepared in which a center hole 222a, a clamping area 222c, a clamping area back face 222c', a stamper clamp groove 222d and pits for information recording are formed on a transparent plastic disk plate 222p. A semi-transparent film 222e is vacuum evaporated on the recording area where the pits for information recording are formed.

In FIG. 9B, an ultraviolet-rays setting type adhesive 203 is dropped and applied, near the center hole 221a, on the bonding face of the first single-side disk plate 221. In FIG. 9C, the second single-side disk 222 with its bonding face downward is placed on the first single-side disk plate 221.

In FIG. 9D, the upper (first) and lower (second) single-side disk plates 221 and 222 are rotated so that they are intimately brought into contact with each other while enlarging redundant adhesive 203 outwardly in the radial direction of the disk plates.

In FIG. 9E, ultraviolet rays are radiated by an ultraviolet rays lamp 204 to harden the ultraviolet-rays setting type adhesive 203. Thus, the composite optical disk structure which permits data to be reproduced from one side thereof can be fabricated.

The composite optical disk structure thus fabricated has the following defect. Specifically, as seen from FIG. 9D, because of load of the single-side disk plate 222 when it is placed on the single-side disk plate 221, the ultraviolet-rays setting type resin 203 applied at the outer periphery of the center holes 221a, 222a may leak out into the center holes 221a and 222a, thus deforming the shapes of these holes. As a result, several problems, e.g. "shaft divergence" that when the disk structure is set in a player, a rotary shaft fluctuates, and "face fluctuation" that the rotary shaft and the center axis of the disk are inclined, occur.

SUMMARY OF THE INVENTION

An object of the present invention is to provide a single-side reproduction type composite optical disk structure which can easily hold the distance between two disk plates and prevent adhesive from sticking out into the holes of the disk plates.

Another object of the present invention is to provide a composite optical disk structure which can prevent adhesive from being leaking out into the center holes of the disk plates to deform the shape of the center holes.

In order to attain the above objects, in accordance with the one aspect of the present invention, there is provided a single-side reproduction type composite optical disk structure comprising: a first transparent disk plate having a first center hole, a first stamper clamp groove and a first information recording area on its one main surface; a second transparent disk plate having a second center hole having a diameter equal to that of the first center hole, a second stamper clamp groove and a second information recording area on its one main surface; a transparent adhesive sandwiched between said first and said second transparent disk plates to bond the one main surfaces of them; a first ring-shaped convex portion formed on the main surface of said first transparent disk plate so as to surround the first center hole; a second ring-shaped convex portion formed on the main surface of said second transparent disk plate so as to surround the second center hole; said first and said second convex portion abutting on each other and each having a prescribed height.

In the single-side reproduction type composite optical disk such a structure, said stamper clamp grooves serve as reservoirs for reserving adhesive and the ring-shaped convex portions formed inside the stamper clamp grooves effectively prevent the adhesive from leaking into the center holes. The ring-shaped convex portions permits a precise interval to be located between said first and said second transparent disk plates.

In accordance with another aspect of the present invention, there is provided a composite optical disk structure comprising: a first transparent disk plate having a first center hole and a total internal reflection film formed on a first information recording area on its one main surface; a second transparent disk plate having a second center hole having a diameter equal to that of the first center hole and a semitransparent film formed on a second information recording area on its one main surface; a transparent adhesive sandwiched between said first and said second transparent disk plates to bond the one main surfaces of them; a stamper clamp groove located inside its information recording area and a reservoir for reserving said transparent adhesive formed between said stamper clamp groove so as to surround said first and said second center hole, which are formed on the one main surface of at least one of said first and said second transparent disk plate The composite optical disk structure having such a structure can prevent adhesive from leaking out into the center holes of the disk plates and hence the shape of the center holes from being deformed.

The above and other objects and features of the present invention will be more apparent from the following description taken in conjunction with the accompanying drawings.

DESCRIPTION OF THE PREFERRED EMBODIMENTS

Embodiment 1

Figure 1A:
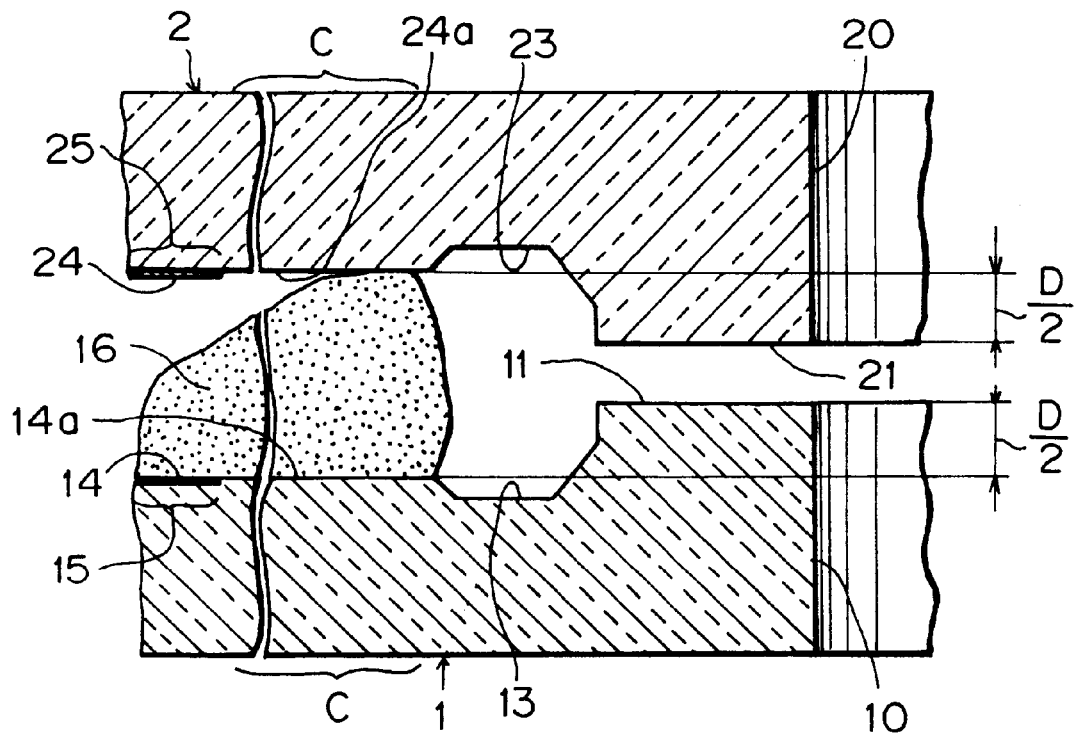
FIGS. 1A and 1B partial enlarged sectional view showing the single-side reproduction type composite optical disk structure according to the first embodiment of the present invention before and after two disk plates are bonded to each other, respectively.
Figure 1B:
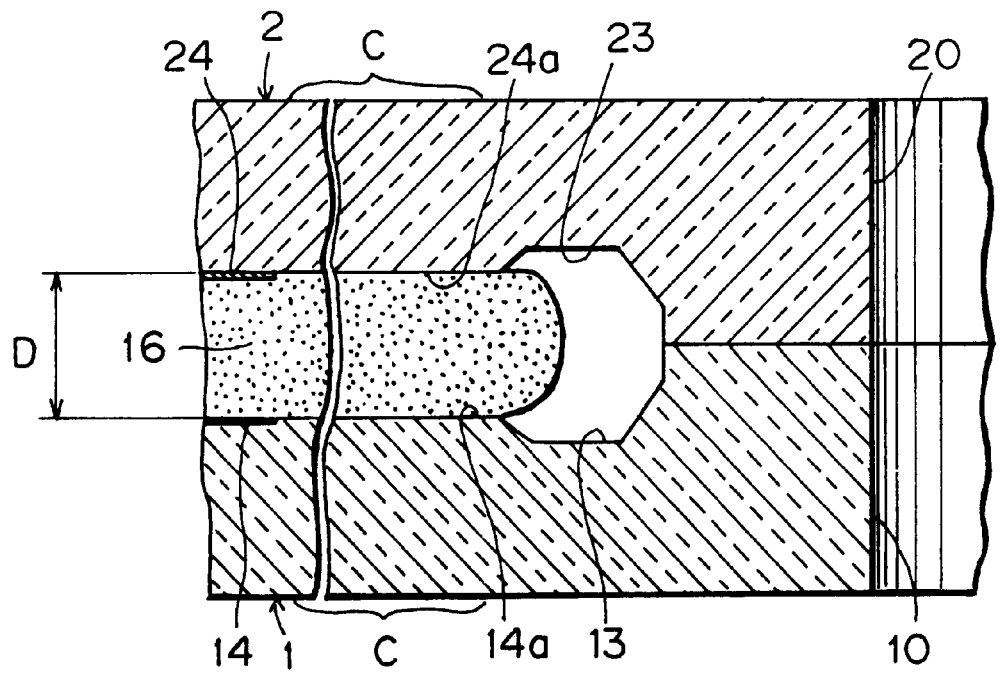

Now referring to FIGS. 1A, 1B and 2, an explanation will be given of the single-side reproduction type composite optical disk structure according to the first embodiment of the present invention.

Figure 2A:
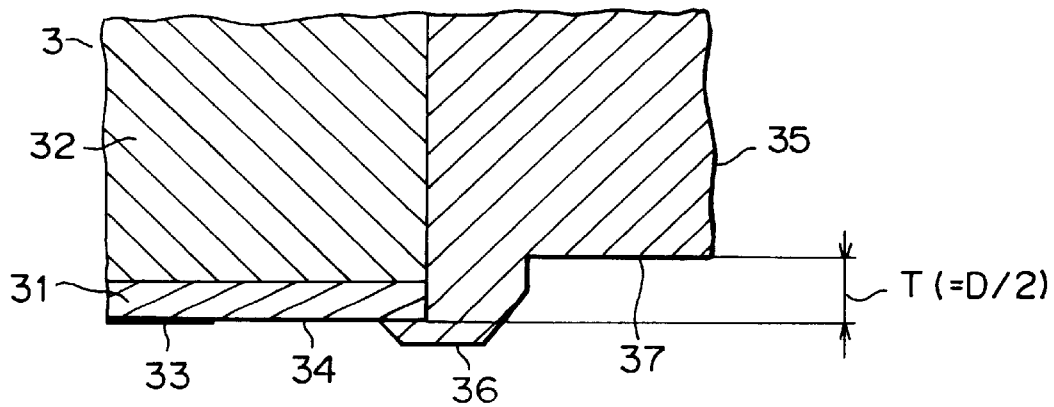
FIGS. 2A to 2C are sectional views showing a metallic mold used in molding a plastic disk plate for a composite optical disk according to one embodiment of the present invention, the plastic disk constituting a part of the composite optical disk according to one embodiment of the present invention, and manner of applying adhesive to the plastic disk plate, respectively.

FIG. 2A shows a metallic mold, generally denoted by reference numeral 3, used in molding a plastic disk of a composite disk structure according to the first embodiment of the present invention. The metallic mold 3 includes a stamper 31 having a duplicating portion 33 for duplicating pits on a data recording area 15 of a plastic disk plate 1 serving as a first transparent disk plate, a first mold component 32 attached to the stamper 31 for mainly molding the data recording area 15, and a second mold component 35 constituting the metallic mold 3 in cooperation with the first metallic mold component 32. From the second stamper component 35, a stamper clamp 36 protrudes outwardly which holds the stamper 31 on the first metallic mold component 32. The stamper clamp 36 is used to form a stamper clamp groove 13 in the plastic disk plate 1.

Figure 2B:
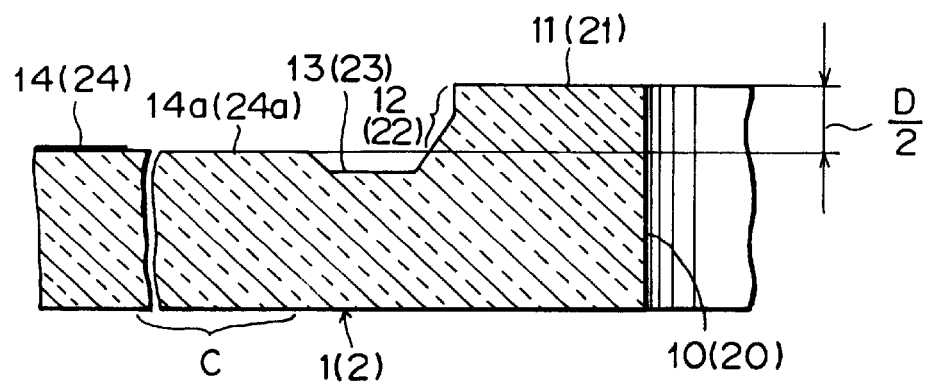

Further, a level difference T is formed between the surface of the stamper 31 which is a molding surface 34 of the first metallic mold component 32 and a molding face 37 of the second metallic mold component 35. The level difference T serves to form a projected portion 11 for making a prescribed interval (40 μm in this embodiment) between the recording surfaces of the first single-side disk plate 1 and the second single-side disk plate 2. The level difference T is set for 20 μm in a direction of plate thickness from the recording face. Thus, the molded plastic disk plate 1, as shown in FIG. 2B, a level difference D/2 having a depth corresponding to half of the interval between the recording surfaces is formed by the upper surface 14a outside the stamper clamp groove 13 and the convex portion 11.

The outer periphery of the convex portion 11 is adjacent to the internal periphery of the stamper clamp groove 13 and the internal periphery thereof reaches the center hole 10.

Thus, on the upper surface 14a outside the stamper clamp 13 of the first transparent disk plate 1 with the level difference D/2, i.e., on the portion of the disk plate 1 stamped by the stamper 31, a total internal reflection film 14 can be formed by the step of making a total internal reflection film. The total internal reflection film 14 may be a metallic film made of e.g. aluminum (Al), nickel (Ni), gold (Au), etc.

Likewise, by using the metallic mold 3 with another stamper replaced, a plastic disk plate 2 serving as a second transparent disk plate can also be formed. On the upper surface 24a outside the stamper clamp 23 of the second transparent disk plate 2 with the level difference D/2, i.e., on the portion of the disk plate 2 stamped by the stamper 31, a semi-transparent film 24 can be formed by the step of making a semi-transparent film. The semi-transparent film 24 may be a dielectric film made of e.g. silicon nitride ($Si_3N_4$), silicon oxide ($SiO_2$), etc.

Figure 2C:
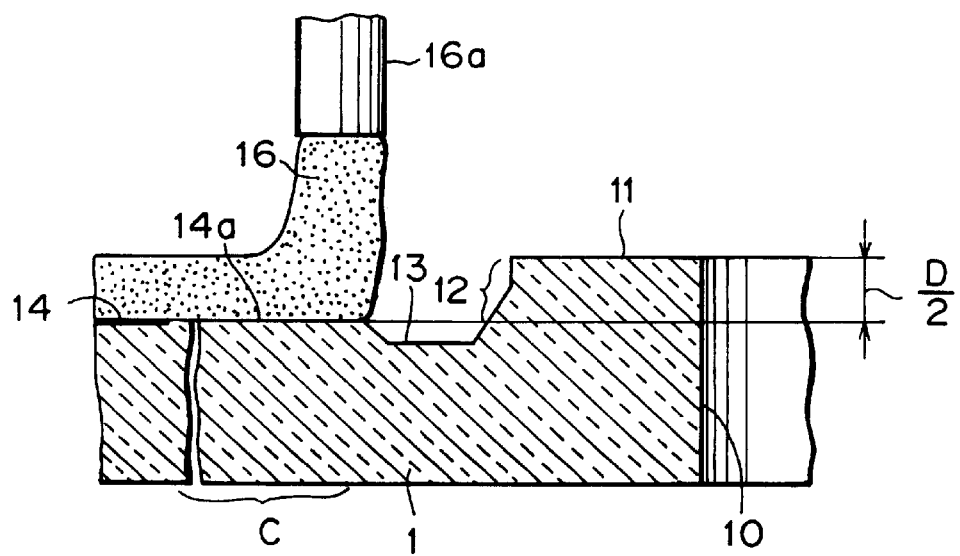

As shown in FIG. 2C, a bonding layer will be formed on the total internal reflection film 14 of the first transparent disk plate 1 as follows. A liquid ultraviolet rays setting type adhesive 16 is dropped toward the stamper clamp groove 13 along the upper surface 14a of the disk plate 1 from a nozzle 16a connected to an adhesive source (not shown). As shown in FIG. 1, the second transparent disk plate 2 is laid on the first transparent disk plate 1 in such a fashion that the semitransparent film 24 of the former is opposite to the total internal reflection film 14 of the latter. In this case, the stamper clamping grooves 13 and 23 serve as reservoirs for reserving the adhesive and the convex portion 11 of the first transparent disk plate 1 is brought into intimate contact with the convex portion 21 of the second transparent disk plate 2. Thus, the dropped adhesive 16 is interrupted by the convex portions 11 and 21 kept in contact with each other so that it will not leak out into the center holes 10 and 20.

Figure 8:
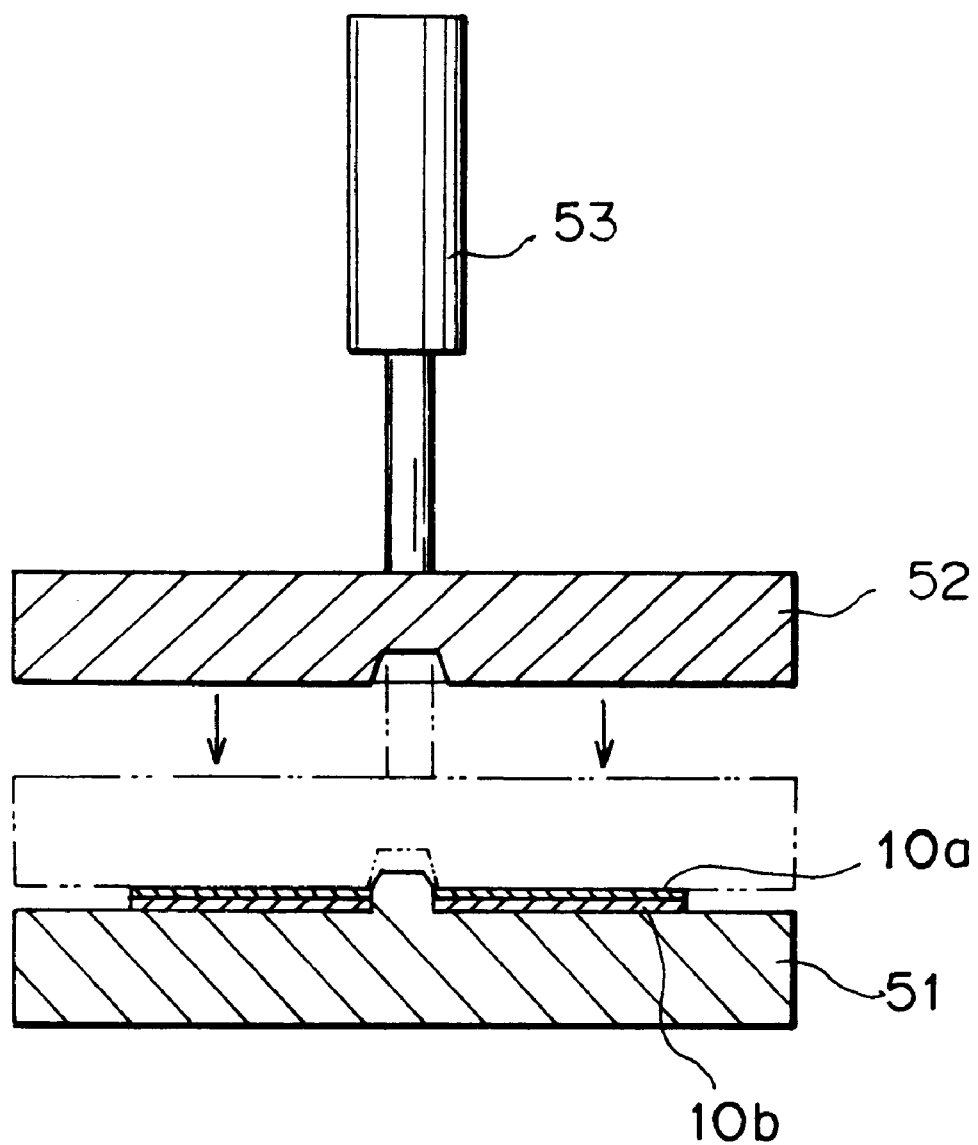
FIG. 8 is a view for explaining the step of bonding.
Figure 9A:
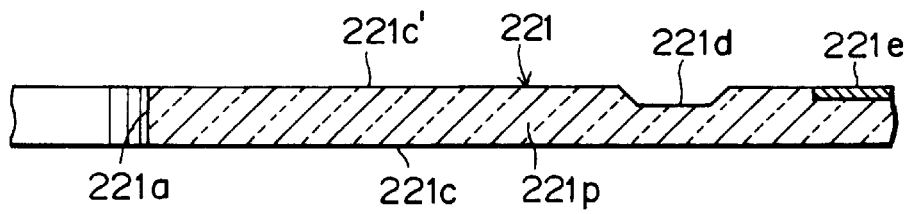
FIGS. 9A to 9E are sectional views showing steps of a process for fabricating a structure of the composite optical disk structure according to the prior art, respectively.
Figure 9B:
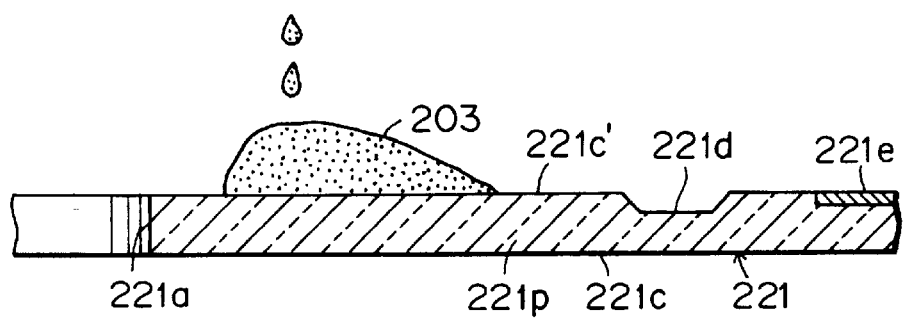
Figure 9C:
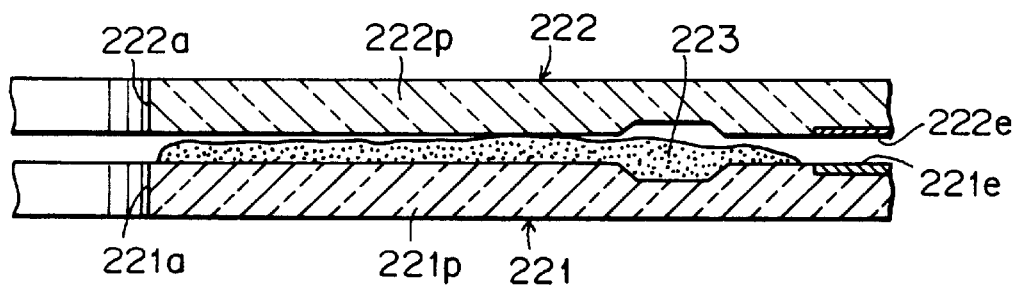
Figure 9D:
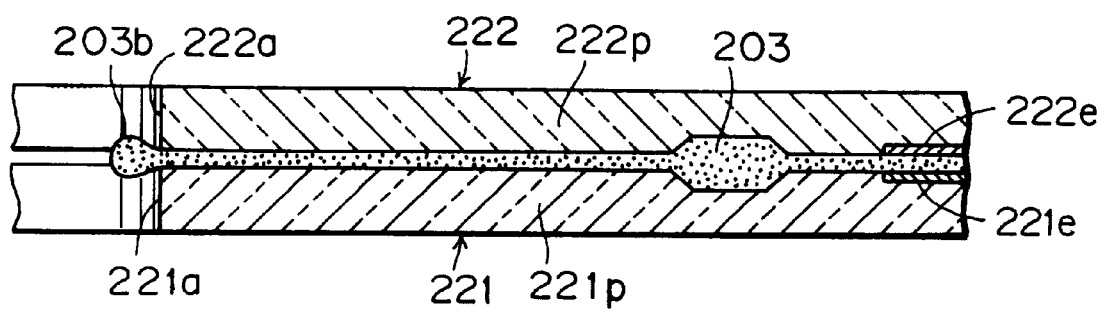
Figure 9E:
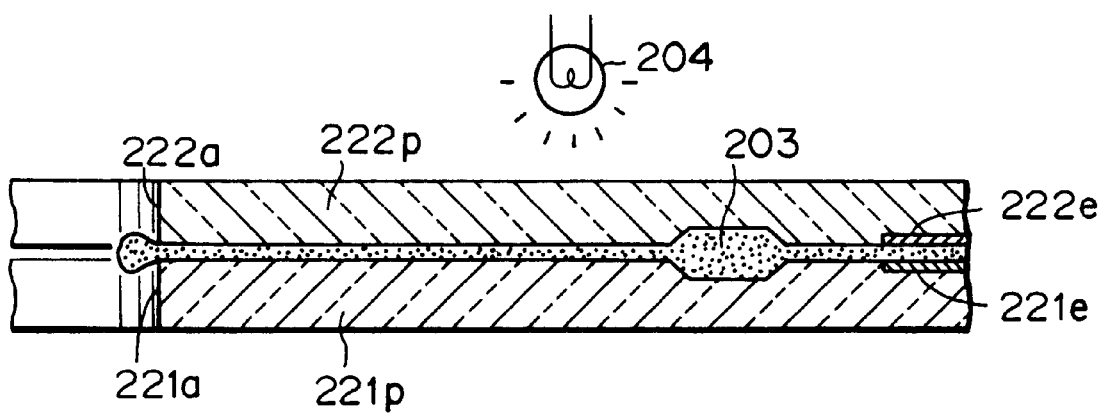

The first and second transparent disk plates thus overlapped are rotated to make the adhesive 16 laminar. As necessity requires, these disk plates 1 and 2 are pressurized by the pressurizing disk plate as shown in FIG. 8.

The laminar adhesive 16 is irradiated with ultraviolet rays through the semi-transparent film 24 from the second transparent disk plate 2 so that it will be hardened. Alternatively, with the second transparent disk plate 2 being down and the adhesive 16 laid on the semitransparent film 24 of the second optical disk plate 2, the adhesive may be irradiated with the ultraviolet rays.

In the single-side reproduction type composite optical disk structure thus fabricated, in which the first and second transparent disk plate have a level difference D/2 of the depth corresponding to half of the interval D between the recording faces, these disk plates can be bonded apart from each other by a prescribed interval (40 μm) between the total internal reflection film 14 of the first transparent disk plate and the semi-transparent film 24 of the second transparent disk plate 2.

Thus, in this embodiment, only provision of the level difference D/2 of the depth corresponding to half of the interval D between the recording faces permits the prescribed interval to be held and also prevents the adhesive from leaking out. For this reason, the shape of the metallic mold 3 has only to be exchanged, and the ordinary fabricating apparatus can be used.

In this embodiment, although the outer peripheries the projected portions 11 and 21 are made adjacent to the internal peripheries of the stamper clamp grooves 13 and 23, the convex portions 11 and 21 may be arranged apart from the inner peripheries and slightly near to the center holes 10 and 20. Further, in this embodiment, although the inner peripheries of the projected portions 11 and 21 are formed to reach the center holes 10 and 20, they may be formed to reach the position slightly outside the center holes 10 and 20.

The above first embodiment is directed to the single-side reproduction type composite optical disk structure in which the reflection film of one of the first and second single-side disk plates is a semitransparent film. But, the present invention can be easily applied to a double-side reproduction type composite optical disk structure in which both reflection films of a pair of single-side disk plates to be bonded are total internal reflection films. In this case, in place of the semi-transparent film 24, a total internal reflection film can be used. Thus, the double-side reproduction type composite optical disk structure can provide the same advantage as in the single-side reproduction composite optical disk structure.

Embodiment 2

Now referring to FIGS. 3A to 3E, an explanation will be given of the second embodiment of the present invention. The composite optical disk structure according to this embodiment will be fabricated as follows.

Figure 3A:
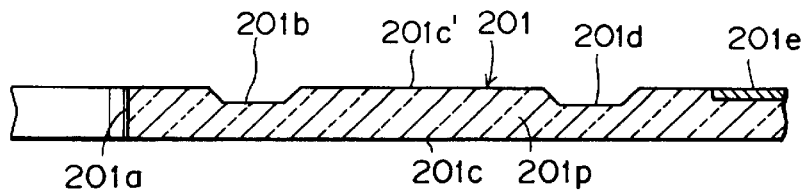
FIGS. 3A to 3E are sectional views showing steps of a process for fabricating a structure of the composite optical disk structure according to a second embodiment of the present invention, respectively.

First, as shown in FIG. 3A, a first single-side disk plate 201 is prepared in which a center hole 201a, a reservoir groove 201b for reserving adhesive, a clamping area 201c, the back face of the clamping area 201c', a stamper clamping groove 201d and pits for information recording are formed in a radial direction from the center of a transparent plastic disk plate 201p serving as a first transparent disk plate. The groove 201b of the first single-side disk plate 201 is formed in the vicinity of the center hole 201a so as to surround it and has a depth of several tens μm to several hundreds μm. A total internal reflection film 201e is formed on the recording area on which pits for information recording are formed.

A second single-side disk plate 202 to be bonded to the first single-side disk plate 201 is prepared in which a center hole 202a, a reservoir groove 202b for reserving adhesive, a clamping area 202c, the back face 202c' of the clamping area 202c, a stamper clamping groove 201d and pits for information recording are formed in a radial direction from the center of a transparent plastic disk plate 202p serving as a second transparent disk plate. The center hole 202a, a reservoir groove 202b for reserving adhesive, clamping area 202c, the back face 202c of the clamping area 202c, stamper clamping groove 202d and pits for information recording in the second single-side disk plate 202 are formed so as to oppose to the center hole 201a, reservoir groove 201b for reserving adhesive, clamping area 201c, the back face 201c' of the clamping area 201c, a stamper clamping groove 201d and pits for information recording in the first single-side disk plate 201. The groove 202b of the second single-side disk 202 is also formed in the vicinity of the center hole 202a so as to surround it and has also a depth of several tens μm to several hundreds μm. A semi-transparent film 202e is formed on the recording area on which pits for information recording are formed.

Figure 3B:
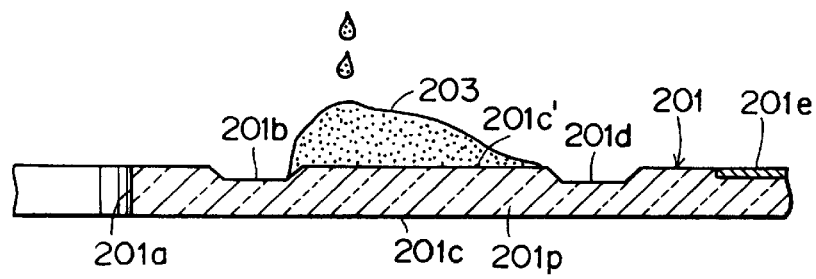

As seen from FIG. 3B, an ultraviolet-rays setting adhesive 203 is dropped at a position of the clamping area back face 201c' located at a bonding face near to the center hole 201a and applied onto the entire clamping area back face 201c'. Then, the reservoir groove 201b is located inside the clamping area back face 201c', i.e., inside the position where the adhesive 203 is dropped.

Figure 3C:
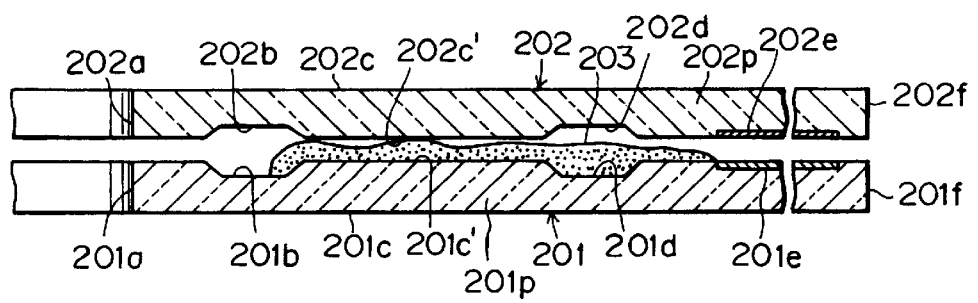

As seen from FIG. 3C, with the bonding face of the second single-side disk plate 202 being downward, the second single-side disk plate 202 is laid on the first single-side disk plate 201. Then, the center hole 201a, reservoir groove 201b for reserving adhesive, clamping area 201c, the back face 201c' of the clamping area 201c, a stamper clamping groove 201d and total internal reflection film 201e in the first single-side disk plate 201 are opposite to the center hole 202a, reservoir groove 202b for reserving adhesive, the back face 202c' of the clamping area 202c, stamper clamping groove 202d and semi-transparent film 202e in the second single-side disk plate 202. The outer peripheries 201f and 202f are also aligned.

Figure 3D:
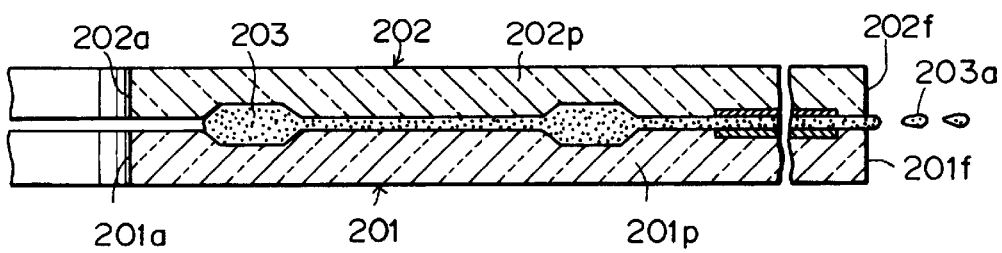

As seen from FIG. 3D, the upper and lower single-side disks 202 and 201 are rotated around the center axis of the center holes 202a and 201a so that redundancy of the adhesive 203 is shaken off outward as spots of adhesive 203a in the radial direction of the first and second disk plates 201 and 202, thus bringing their bonding faces into intimate contact with each other.

Figure 3E:
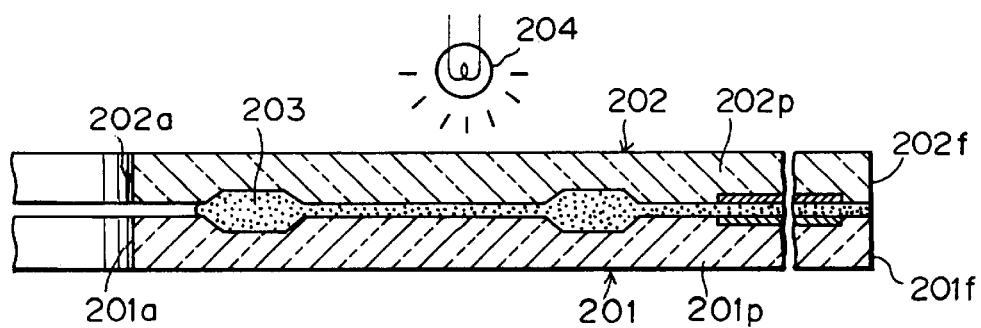

As seen from FIG. 3E, the adhesive 203 is irradiated with ultraviolet rays from an ultraviolet rays lamp 204 so that it is hardened. Thus, the composite optical disk structure which permits reproduction from the one side can be fabricated.

In the composite optical disk structure thus fabricated, when the second single-side disk plate 202 is laid on the first single-side disk plate 201 in the step shown in FIG. 3C, because of pressure applied from the second single-side disk plate 202, the adhesive 203 will also flow toward the centers of the disk plates 201 and 202. In this case, since the reservoirs 201b and 202b are formed between the center holes 201a, 202a and the back faces 201c' and 202c' of the clamping areas, respectively, as seen from FIG. 3D, the flowed adhesive 203 remains in the reservoirs 201b and 202b. For this reason, the adhesive will not leak out into the center holes 201a and 202a. Hence, the adhesive 203 will not harden within the center holes 201a and 202a and the shapes of the center holes will not be deformed.

In this embodiment, although the reservoirs and the center holes are apart from each other by a prescribed distance, they may be adjacent to each other or coupled with each other.

Further, in place with the ultraviolet rays setting adhesive used in this embodiment, a transparent polymerized type adhesive such as two-liquid reaction type.

Figure 4:
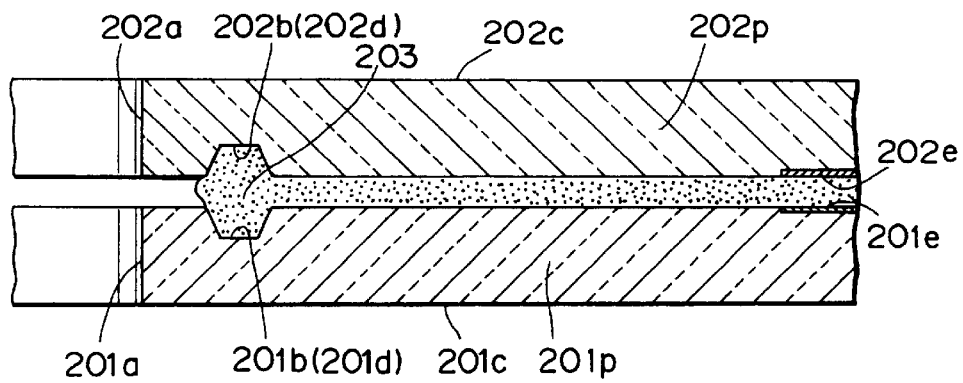
FIG. 4 is a longitudinal sectional view showing the process for fabricating the composite optical disk structure according to a modification of the second embodiment of the present invention.
Figure 5A:
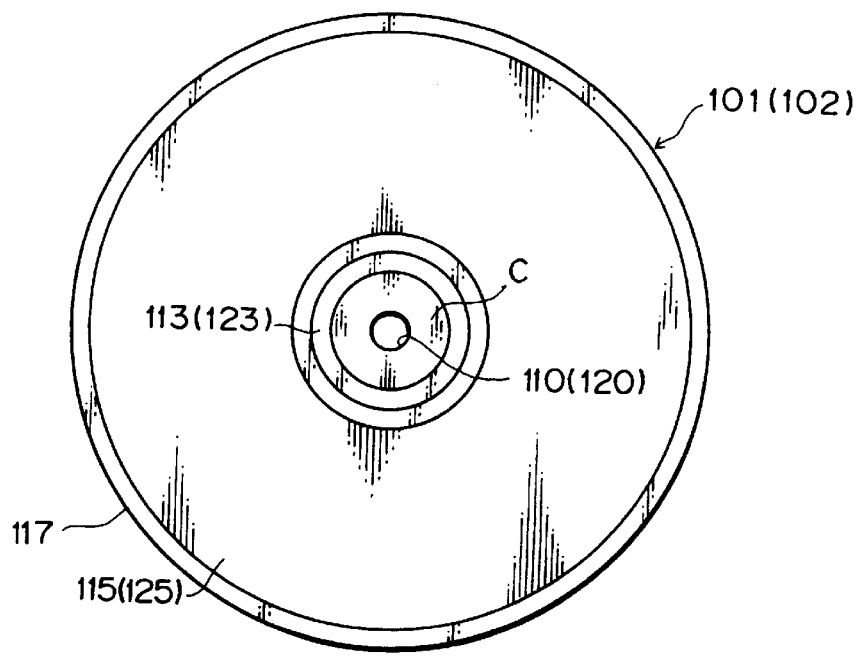
FIGS. 5A and 5B are a plan view and a sectional view of conventional single-side optical disk plates before they are bonded to each other.
Figure 5B:
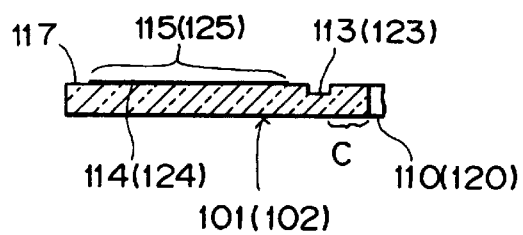
Figure 6A:
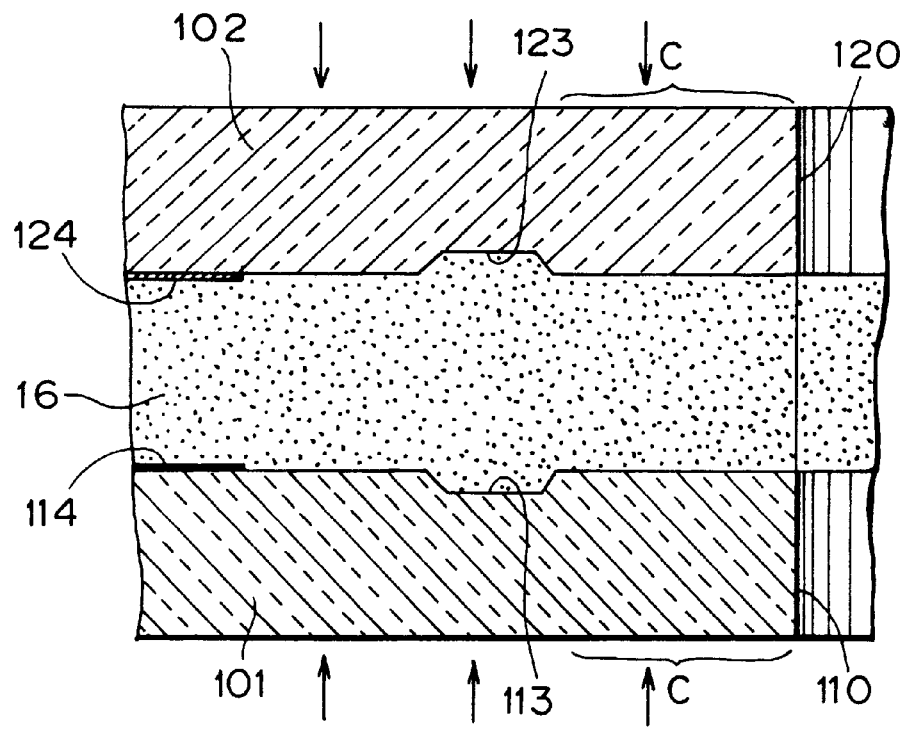
FIGS. 6A and 6B are sectional view showing the bonding manner of the conventional single-side reproduction type composite optical disk structure.
Figure 6B:
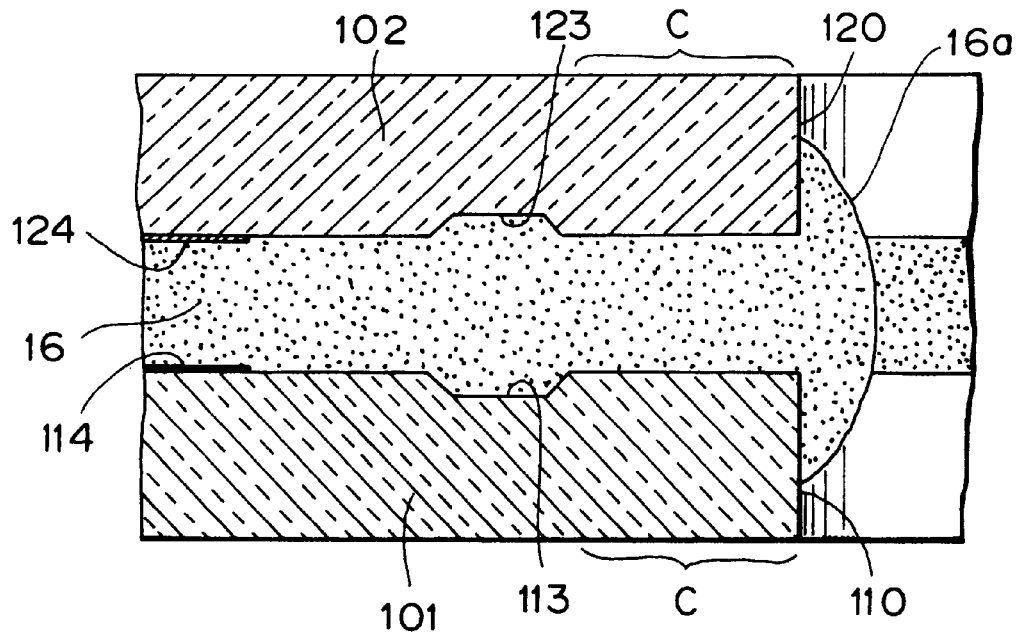
Figure 7:
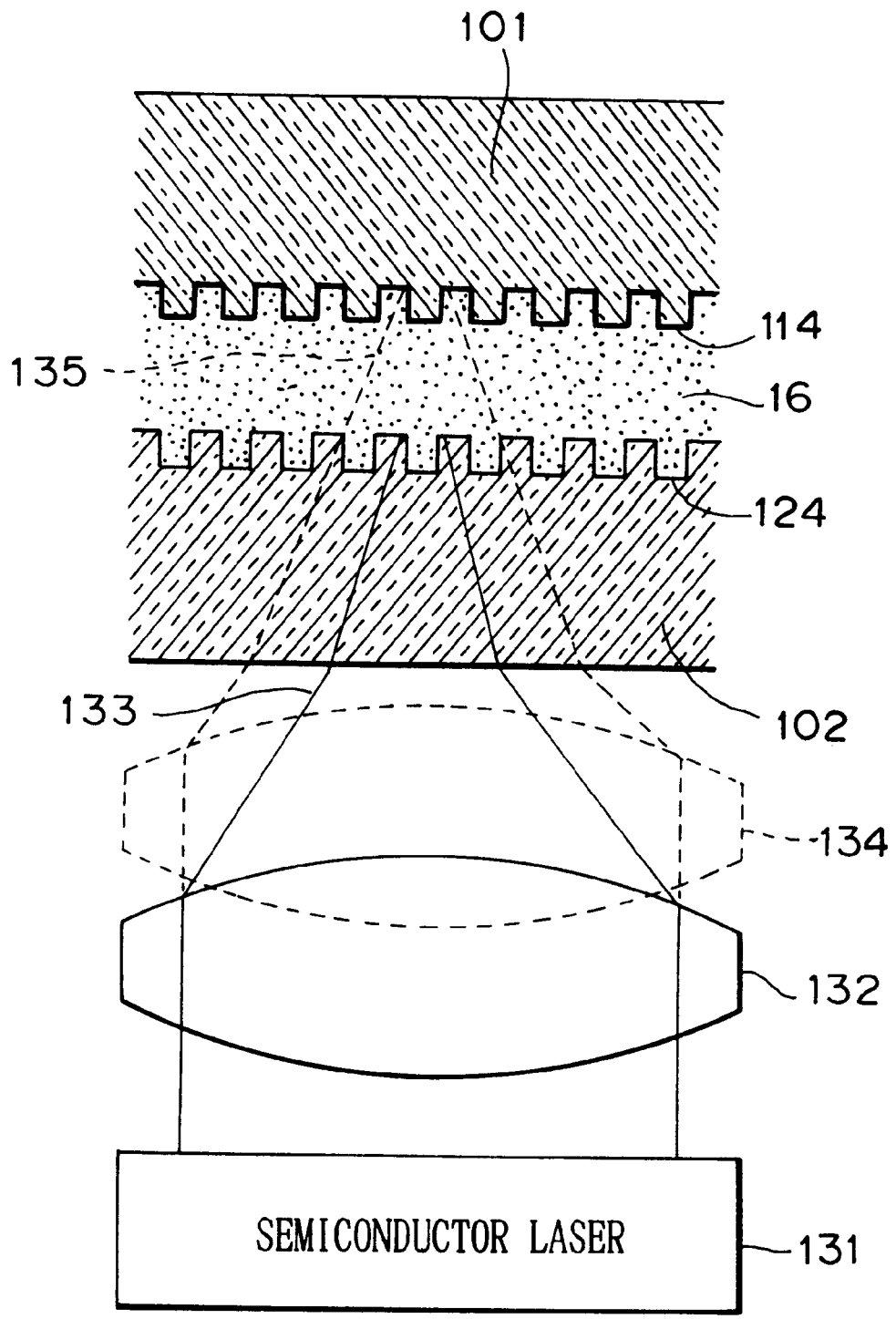
FIG. 7 is a sectional view showing the operation principle of the single-side reproduction type composite optical disk structure.

FIG. 4 shows a modification of the second embodiment of the present invention. Specifically, the stamper clamp grooves 201d and 202d, are also served as the reservoir grooves 201b and 202b. In FIG. 4, like reference numerals refer to like parts in FIGS. 3A to 3E.

In this modification, in order that the stamper clamp grooves can serve as the adhesive reservoirs, the stamper clamp grooves are formed in the vicinity of the center holes. In such a structure, since the adhesive is applied outside the stamper clamp grooves, in bonding, the adhesive can be prevented from leaking out into the center holes.

The second embodiment and its modification are directed to the single-side reproduction type composite optical disk structure in which the reflection film of one of the first and second single-side disk plates is a semitransparent film. The present invention can be easily applied to a double-side reproduction type composite optical disk structure in which both reflection films of a pair of single-side disk plates to be bonded are total internal reflection films. In this case, in place of the semi-transparent film 202e, a total internal reflection film can be used. Thus, the double-side reproduction type composite optical disk structure can provide the same advantage as in the single-side reproduction composite optical disk structure.

Further, in the double-side reproduction type composite optical disk structure also, as shown in FIG. 4, the stamper clamp groove may be used as a reservoir for reserving adhesive. In this case also, in the manner of the above modification, in bonding, the adhesive can be prevented from leaking out into the center holes.

What is claimed is:

1. A single-side reproduction type composite optical disk structure comprising:

a first transparent disk plate having a first center hole, a first stamper clamp groove and a first information recording area formed on its one main surface;

a second transparent disk plate having a second center hole having a diameter equal to that of the first center hole, and a second stamper clamp groove and a second information recording area formed on its one main surface;

a transparent adhesive sandwiched between said first and said second transparent disk plates to bond the one main surfaces of them;

a first ring-shaped projection formed on the main surface of said first transparent disk plate so as to surround the first center hole, forming a portion thereof;

a second ring-shaped projection formed on the main surface of said second transparent disk plate so as to surround the second center hole, forming a portion thereof;

said first and second projections having an approximately equal height and abutting each other, thereby preventing the adhesive from flowing into the first and second center holes.

2. A single-side reproduction type optical composite disk structure according to claim 1, wherein said first and said second ring-shaped convex projections are adjacent to inner peripheries of said first and said second stamper clamping grooves respectively.

3. A single-side reproduction type optical composite disk structure according to claim 1, wherein either one of said first information recording area or said second information recordings area is covered with a total internal reflection film and the other thereof is covered with a semi-transparent film.

4. A single-side reproduction type composite optical disk structure according to claim 1, wherein both of said first information recording area and said second information recording area are covered with a total internal reflection film, respectively.

5. A single-side reproduction type composite optical disk structure according to claim 1, wherein said transparent adhesive is an ultraviolet rays setting type adhesive.

* * * * *